(12) United States Patent
Rosenberg

(10) Patent No.: US 7,010,471 B2
(45) Date of Patent: Mar. 7, 2006

(54) HIERARCHICAL TOPOLOGICAL NETWORK DESIGNING SYSTEM AND METHOD

(75) Inventor: Eric Rosenberg, Lincroft, NJ (US)

(73) Assignee: AT&T Corp., New York, NY (US)

( * ) Notice: Subject to any disclaimer, the term of this patent is extended or adjusted under 35 U.S.C. 154(b) by 441 days.

(21) Appl. No.: 10/346,460

(22) Filed: Jan. 17, 2003

(65) Prior Publication Data

US 2004/0143425 A1 Jul. 22, 2004

(51) Int. Cl.
*G06F 17/50* (2006.01)
*H04Q 9/00* (2006.01)

(52) U.S. Cl. .......................................... 703/2; 370/408
(58) Field of Classification Search ................... 703/2, 703/13; 370/252, 256, 466, 222, 408; 709/201; 340/825.02

See application file for complete search history.

(56) References Cited

U.S. PATENT DOCUMENTS

| | | | |
|---|---|---|---|
| 4,823,111 A * | 4/1989 | Tsuchiya et al. ............ 370/408 |
| 5,583,860 A | 12/1996 | Iwakawa et al. |
| 5,619,632 A * | 4/1997 | Lamping et al. ............ 345/441 |
| 5,732,192 A * | 3/1998 | Malin et al. .................... 703/2 |
| 5,754,738 A | 5/1998 | Saucedo et al. |
| 5,832,182 A * | 11/1998 | Zhang et al. .................. 706/50 |
| 5,878,227 A | 3/1999 | Wade et al. |
| 5,895,459 A | 4/1999 | Enomoto |
| 6,049,593 A * | 4/2000 | Acampora .................. 379/56.2 |
| 6,317,438 B1 * | 11/2001 | Trebes, Jr. ................... 370/466 |
| 6,374,202 B1 | 4/2002 | Robinson |
| 6,377,543 B1 | 4/2002 | Grover et al. |
| 6,385,454 B1 * | 5/2002 | Bahl et al. .................. 455/450 |
| 6,741,568 B1 * | 5/2004 | Barillaud ..................... 370/252 |
| 2003/0208523 A1 * | 11/2003 | Gopalan et al. ............ 709/201 |
| 2004/0017783 A1 * | 1/2004 | Szentesi et al. ............. 370/256 |

* cited by examiner

*Primary Examiner*—Thai Phan
(74) *Attorney, Agent, or Firm*—Hoffmann & Baron, LLP

(57) ABSTRACT

The present invention provides a method called, the "cluster method", for designing an efficient and low cost network that satisfies certain requirements, and in particular, that satisfies the requirement of having a prescribed number of nodes. The method first computes a provably optimal (or near optimal, in some cases) solution to small network design problems with the three following constraints. First, the network must be immune to the failure of a single link. Second, the network diameter cannot exceed a prescribed value. Third, the maximum node degree cannot exceed a prescribed value. The solutions to the small problems are combined, using an optimization technique called "dynamic programming," to design large networks subject to the three above constraints. This cluster method is a hierarchical method, since the solutions to small problems are combined to solve a large problem. The resulting large network design meets the given survivability, diameter and maximum node degree constraints.

11 Claims, 5 Drawing Sheets

ASSEMBLER EXAMPLE:
P(22,5,4) IS SOLVED USING
FOUR INTERCONNECTED
CLUSTERS

FIG. 2
SMALL NETWORK SEEDS
FIG. 2a
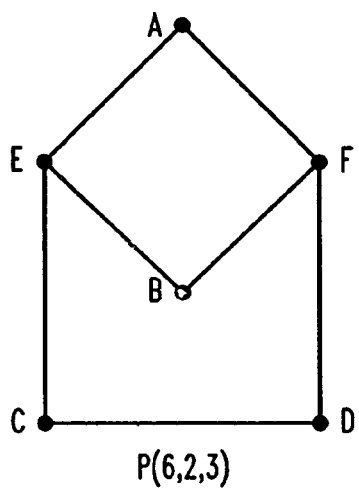
P(6,2,3)
FIG. 2b
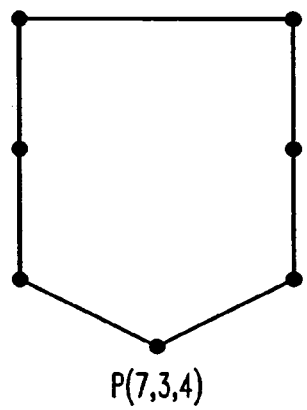
P(7,3,4)
FIG. 2c
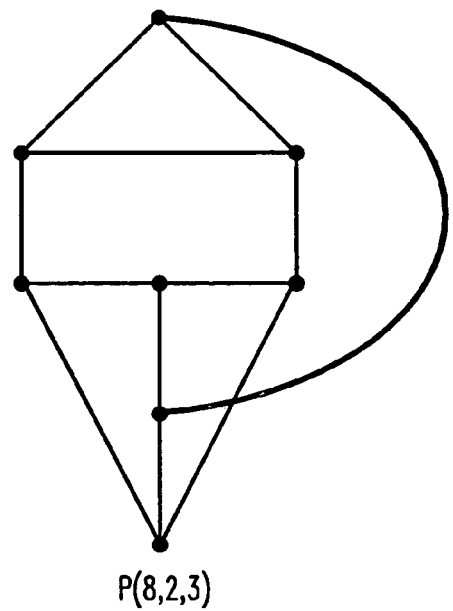
P(8,2,3)
FIG. 2d
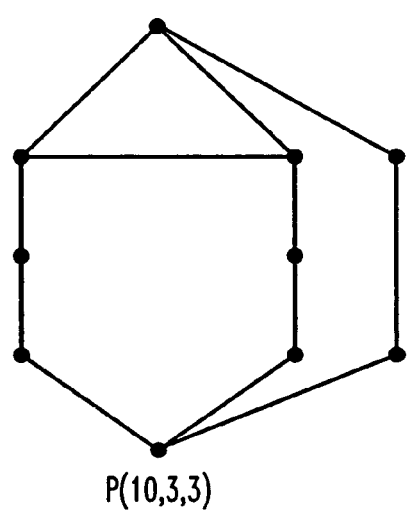
P(10,3,3)

LINK NUMBERS FOR THE SEED
GENERATOR APPLIED TO P(4,2,3)

ASSEMBLER EXAMPLE:
P(22,5,4) IS SOLVED USING
FOUR INTERCONNECTED
CLUSTERS

HIERARCHICAL TOPOLOGICAL NETWORK DESIGNING SYSTEM AND METHOD

FIELD OF THE INVENTION

The present invention relates to a method of designing a network of nodes and links using an optimization technique, and particularly, although not exclusively, to a communications network.

BACKGROUND OF THE INVENTION

In general, there are several known techniques for designing a physical network comprised of a plurality of nodes interconnected by a plurality of links. Several constraints or requirements must be taken into consideration in designing a network. A few of these constraints include the "diameter" of a network, the "node degree" of any node, the immunity to the failure of a single node or link, etc. Given a set of network designs that satisfy the constraints mentioned above, the "objective function" or "metric" used to rank the designs is the total number of links, which we want to be as small as possible. In telecom applications, this means we want to find the network design using the fewest fiber optic cables. Every telecommunications service provider who builds physical networks faces this problem. The problem is particularly difficult to solve when the number of nodes is large, the network diameter is required to be small, and the maximum node degree is also required to be small. Yet these are exactly the conditions facing a telecom service provider, since a service provider must have equipment in many locations to service customers, must provide a low diameter network to keep the delay low on all connections, and must have a small maximum node degree to keep equipment costs low.

There is a lack of methods to solve large network design problems that incorporate the constraints mentioned above. Many existing methods are unpredictable, in that they are heuristics, which may perform poorly. Other existing methods are designed to produce the optimal answer, but are totally impractical for large problems, since they would take hours or days to run on a computer. Therefore, there is a need of an efficient method of designing a low cost network that satisfies these constraints.

SUMMARY OF THE INVENTION

The present invention provides a method for optimally connecting a large network having a plurality of n nodes interconnected by a plurality of links so as to minimize network cost and satisfy connectivity constrains, the method including separating the n nodes into k clusters, for a range of values of k, generating a near-optimal design for each of the k clusters to select the links interconnecting the nodes in each cluster, subject to the connectivity constraints. The method further includes determining a near-optimal set of links for full set of the n nodes by combining the designs for each of the k clusters, subject to the connectivity constraints wherein the near-optimal set of links being nearly smallest possible number of the links.

BRIEF DESCRIPTION OF THE DRAWINGS

FIG. 2 shows four small examples of multiple nodes and links connected to make an optimal or near-optimal network design.

DETAILED DESCRIPTION OF THE INVENTION

Definitions

The term network denotes a set of n nodes, for example telecommunication switches in specified locations, connected by a set of links, for example fiber optic cables. A link represents a transmission pathway between two nodes, such as a fiber optic cable along which data can be sent. The diameter of a network is the maximum distance between any two nodes in the network, whereby the "distance" between two given nodes is the minimum number of links that must be traversed to go from one of the given nodes to the other. Thus, for example, if the diameter is 5 then there is a path of no more than 5 links connecting any two nodes in the network. The node degree of a node is the number of links connected to the node. Thus, for example, if four fiber cables connect to a switch, the node degree of the switch is four. The maximum node degree is the largest node degree, taken over all the nodes in the network.

Two further definitions concern certain "survivability" constraints that the network must satisfy. A network is "single link survivable" if, given that a single link fails, a path still exists between any two nodes in the network. For example, in a ring network interconnecting a set of nodes, if one link in the network fails, a path exists between any two nodes by going the other way around the ring.

Designing a network, also known as "network design", is the problem of selecting the smallest number of links to interconnect a set of nodes, where the number n of nodes is given data, such that three constraints are satisfied:

The network must be single link survivable (b) The diameter of the network cannot exceed a specified number d, called the "diameter bound." Thus, for example, it may be required that any two nodes be connected by a path using not more than 5 links, in which the diameter bound is 5.

(c) The maximum node degree cannot exceed a specified number Δ, called the "maximum node degree bound." Thus, for example, it may be required that no more than six fiber optic cables can connect to a switch, in which case the maximum node degree bound is six.

Figure 1:
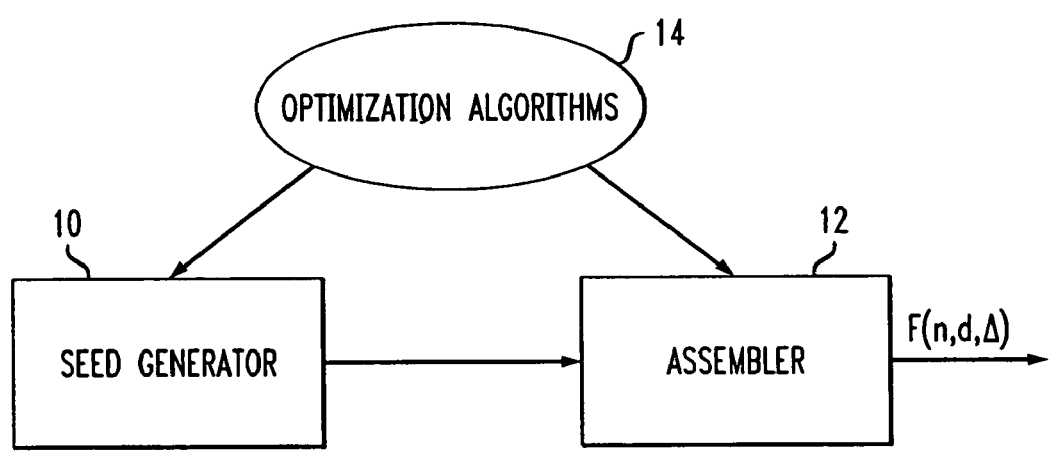
FIG. 1 is a functional layout of main components for implementing a preferred optimization technique according to the present invention.

Referring to FIG. 1, there is shown a general overview for a network design apparatus which utilizes optimization techniques called "branch and bound" and "dynamic programming" for optimization of the network comprising nodes and links subject to the three above constraints. A physical network is represented as a two dimensional network map comprising a plurality of nodes and a plurality of links. The network design apparatus may be used for constructing the links defining the design of any network comprising node equipment and links equipment, e.g., a utilities services network such as a gas pipeline network, a road network, an airline network, an electricity supply network, a water distribution network or a communications network, for example, a computer network or a telecommunications network. Hereinafter, by way of example the network design apparatus and its method of operation by construction of links will be described using the example of a telecommunications network.

The network map comprises a comprehensive set of instructions for building a physical network. The nodes of the map represent pieces of physical node equipment and their locations. For example, they could be electrical generators in the case of an electricity supply network, airports in the case of an airline network, or telecommunications switches in the case of a telecommunications network. The links of the map represent physical or logical links. For example, they could be copper wires in the case of an electricity supply network, hops between airports in the case of an airline network, or fiber optical cables or microwave radio paths in the case of a telecommunications network.

The network map contains data representing the physical locations of nodes and links relative to one another, or relative to a predetermined geography, along possibly with other characteristics relevant to the network. For example in the case where the network design apparatus is used to design a telecommunications network, the network map may also contain data representing routing tables, fiber optic cable and switch capacities, service functions, and data describing costs or other performance criteria of hardware components. The network map may be stored in electronic form in an electronic processor or memory.

The network design apparatus in FIG. 1 may preferably be realized as having two components, a seed generator 10 and an assembler 12. The seed generator 10 uses well-known optimization techniques such as branch-and-bound, and simple graph theory algorithms such as the shortest path method, from optimization algorithms 14 to find the optimal or near-optimal solution to small network design problems having the three constraints described above. By "small network", it is generally meant having a network from 3 to about 12 nodes. Once the seed generator 10 computes optimal or near-optimal network designs for a set of small problems, to compute a network design for a problem whose size is larger than considered in the seed generator 10, the assembler 12 pieces together the seeds in an optimal manner to find an optimal or near-optimal network design for the original problem, utilizing the dynamic programming technique from optimization algorithms 14.

We use the expression $P(n, d, \Delta)$ to refer to the problem of finding a network design with the smallest number of links for a network of n nodes, such that the network is single link survivable, the diameter does not exceed the diameter bound d, and the maximum node degree does not exceed the maximum node degree bound $\Delta$. Thus, for example, $P(20, 3, 4)$ refers to the problem of finding a single link survivable network design with the smallest number of links for a network of 20 nodes, where the diameter cannot exceed 3 and the maximum node degree cannot exceed 4. A network design for $P(n, d, \Delta)$ is said to be feasible if it satisfies the three constraints (a), (b), and (c), otherwise it is said to be infeasible.

The seed generator 10 as discussed above computes optimal or near-optimal designs for small networks of preferably size 3 to size 12, such that each design satisfies the three above constraints (a), (b), and (c), for various diameter bounds and maximum node degree bounds. For example, the seed generator can generate optimal or near-optimal network designs for networks of size from 3 to 12 nodes, for diameter bounds from 2 to 6, and for maximum node degree bounds 3 to 5. Some of these network designs are shown in FIG. 2. For example, FIG. 2a shows the optimal network design computed by the seed generator 10, for $P(6,2,3)$, that is, for a cluster of 6 nodes with a diameter bound d of 2 and a maximum node degree bound $\Delta$ of 3. The nodes are indicated by an "•" and referred to as letters A, B, C, D, E and F. The links are the lines connecting the nodes. The optimal design uses 7 links. This is the provably best design for 6 nodes—no other network design for 6 nodes, with diameter bound 2 and maximum node degree bound 3, uses fewer than 7 links. As another example, FIG. 2b shows the optimal network design, computed by the seed generator 10, for $P(7,3,4)$, that is, for a cluster of 7 nodes, with a diameter bound of 3 and maximum node degree bound of 4. The network design uses 7 links, in a ring structure. FIG. 2c shows the network design, computed by the seed generator 10, for problem $P(8,2,3)$. The network design uses 12 links. Finally, FIG. 2d shows the network design, computed by the seed generator 10, for a $P(10,3,3)$. The network design uses 12 links.

Figure 3:
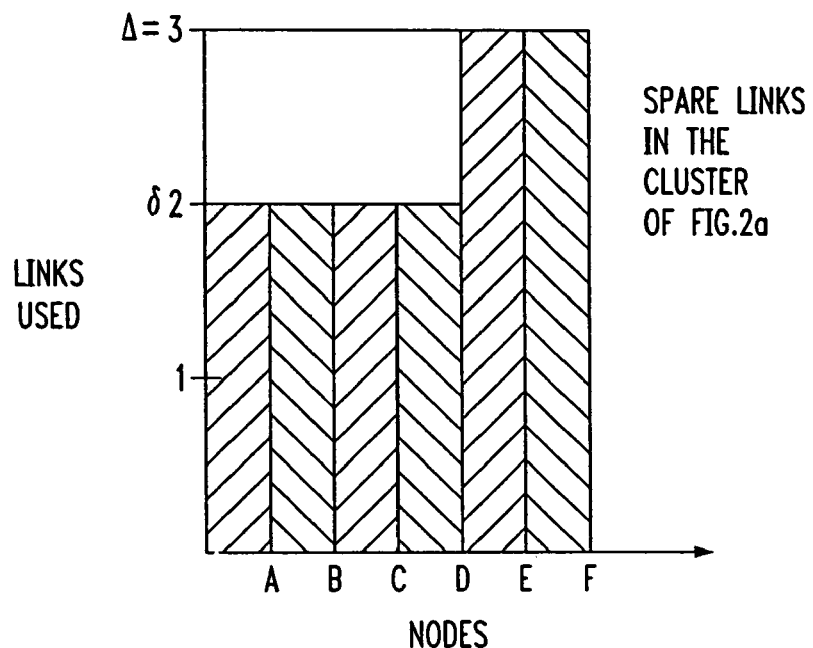
FIG. 3 shows a graphical representation of the node degree for each node in a small network.

FIG. 3 shows a graphical representation of the node degree for each node in a small network as will be described below. Referring back to the example in FIG. 2a, $\Delta=3$, so that no more than 3 links can terminate on any node. From FIG. 2a, we see that for nodes, E and F, three links connect to each of these nodes. Therefore, in FIG. 3 there are two shaded vertical rectangles of height 3, indicating that the node degree for these two nodes is 3. For nodes A, B, C, and D, two links connect to each of these nodes. Therefore, in FIG. 3 there are four shaded vertical rectangles of height 2, indicating that the node degree for each of these four nodes is 2. The maximum node degree is maximum$\{2,3\}=3$, which does not exceed the maximum node degree bound $\Delta$, which is 3. For nodes A, B, C and D, one additional link can be connected to each of these nodes, while for nodes E and F, no additional links can be connected. Therefore, the total number of additional links that can be connected to this cluster is 4.

The Seed Generator

The seed generator 10 as mentioned above, computes an optimal or near-optimal network design for a set of small problems. A small problem instance is called a "cluster." The optimal or near-optimal network design for a cluster is called a seed, and the seeds will be used by the assembler 12 to construct a solution of the original problem. The larger the set of seeds, the larger the set of possible network designs that the assembler 12 can utilize. For some clusters, determining the optimal network design requires no computation. For example, when the diameter bound is 1, then there must be a link directly connecting each two nodes in the cluster. However, since the solution to many small problems, such as $P(8, 2, 4)$, is not immediately known, it is necessary to devise a general procedure for finding the optimal or near-optimal network design for $P(n, d, \Delta)$. Since this is only possible for small values of n, d, and $\Delta$, the seed generator 10 will only be applied for small values of n, d, and $\Delta$.

The seed generator specializes the optimization procedure in optimization algorithms 14 known as branch-and-bound for solving $P(n, d, \Delta)$. We associate a binary, variable, which can have only the values 0 or 1, with each of the $n(n-1)/2$ possible links between a pair of nodes. Thus there are $n(n-1)/2$ variables associated with $P(n, d, \Delta)$. The seed generator 10 creates a binary search tree (BST) with n levels. A given binary search tree node (BSTN) in the BST represents a partially completed network design for P(n, d, Δ). A BSTN is identified by a subset of the variables fixed at 0, another subset fixed at 1, and the remainder free (not yet fixed). If a variable is fixed at 0, then the corresponding link cannot be used in the network design corresponding to the BSTN. If a variable is fixed at 1, then the corresponding link must be used in the network design corresponding to the BSTN. If the variable is free, then the corresponding link is available to be added to the network design.

At the root of the tree, no variables are fixed. At each leaf node of the tree, all n(n−1)/2 variables are fixed. An array of integers is used to indicate the current binary search tree node being examined. Fathoming tests listed below are used to determine if there is any value in pursuing the current BSTN, where pursuing a BSTN means fixing the value of some free variable. The stronger the fathoming tests, the more BST nodes we can eliminate from further exploration. At some BSTN the corresponding network design may turn out to be feasible, which means that the network design satisfies all three constraints. If multiple feasible network designs are discovered in the course of building the binary search tree, the feasible network design with the smallest number of links is stored, and this network design is called the "incumbent." Many BST nodes might have to be explored before a feasible network design is generated. If the best possible design that can be obtained at a given BSTN has an objective function value exceeding the incumbent's value, then that BSTN is fathomed, i.e., it need not be explored further. This is just one of the fathoming tests that is used to "prune" a binary search tree.

Fathoming Tests

Let v be cost of the incumbent, that is, the number of links in the incumbent. If there is no incumbent, v=+infinity. Suppose, at a given BSTN in the search tree, numFixed links are fixed at 0 or 1, and numPos are fixed at 1. The tests below are applied in the order listed, with the idea being that the early tests are computationally inexpensive, and only if they fail are the more computationally expensive tests applied.

Test 1. If numPos+n(n−1)/2−numFixed<n then the BSTN is fathomed.

Test 2. If the cost of the network when all free variables are set to 0 exceeds the incumbent cost v, the BSTN is fathomed.

Test 3. If the maximum node degree, computed using only the links set to 1, exceeds Δ, the BSTN is fathomed.

Test 4. If the network is not connected when all free links are set to 1, the BSTN is fathomed.

Test 5. If the diameter bound d is violated when all free links are set to 1, the BSTN is fathomed.

Test 6. If numFixed=n(n−1)/2 and the network is not feasible, the BSTN is fathomed.

Test 7. Set the free variables to 0. If the network is not feasible and numPos>=v−1, the BSTN is fathomed.

Test 8. Set the free variables to 0. If the network is feasible, the BSTN is fathomed.

Test 9. Set the free variables to 0. If the network is feasible and the numPos=n, the BSTN is optimal.

Test 1 is valid since a feasible network design must use at least n links and n(n−1)/2 −numFixed links are free. Test 7 is valid since at least one additional link is required to obtain feasibility and one additional link would make the current cost equal to that of the incumbent. Test 9 is valid since any survivable network design for P(n, d, Δ) must use at least n links.

There may be alternative optima for problem P(n, d, Δ), that is, multiple network designs that satisfy the three constraints and have the same number of links as the incumbent. As a secondary criterion, we minimize the maximum node degree of any feasible network design. Thus, when a feasible network design with the same cost as the incumbent is encountered, that network design becomes the new incumbent if the maximum node degree for this design is less than the maximum node degree for the incumbent.

Figure 4:
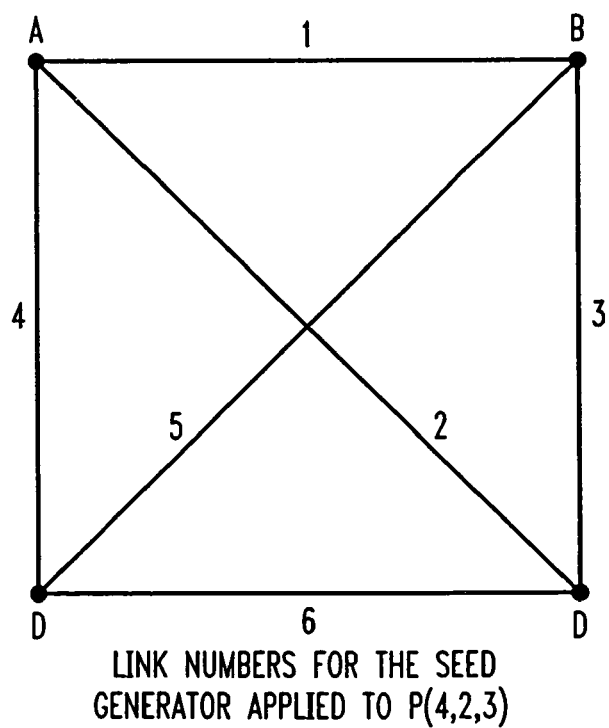
FIG. 4 shows the link numbering used by the seed generator for a small example.

For example, we consider the problem P(4,2,3) having four nodes, diameter bound d=2, and maximum node degree bound Δ=3. Let the nodes be labelled A, B, C, and D. Since n=4, there are n(n−1)/2=6 possible links. Referring to FIG. 4, we number them as follows:

| Link Number | Link |
| --- | --- |
| 1 | (A, B) |
| 2 | (A, C) |
| 3 | (B, C) |
| 4 | (A, D) |
| 5 | (B, D) |
| 6 | (C, D) |

The "full-mesh" network design obtained by using all 6 links as shown in FIG. 4 satisfies all the constraints, so it becomes the incumbent, with a cost of 6.

The branch and bound algorithm examines nodes in a binary search tree. A node in the binary search tree represents a partial specification of a network design. A binary search tree node is represented by an array. If an element of the array is the positive number i, then link i is used in the network design. If an element of the array is the negative number −i, then link i is not used in the network design. For a link j, there may be no element j or −j in the array; this means that we might further specify the search tree node by inserting j or −j into the array to create a new binary search tree node (BSTN).

We start with [1] as the first BSTN. The notation [1] means that there is a single element in the array and the element is 1, so link (A,B) is used. Thus numFixed=1, numPos=1, and the remaining 5 links are free. Since we cannot fathom the BSTN using the 9 Fathoming Tests, we create the new BSTN [1 2]. Now both links 1 and 2 are required to be used. We still cannot fathom this so we create the new BSNT [1 2 3]. This cannot be fathomed, so we create [1 2 3 4]. This cannot be fathomed, so we create [1 2 3 4 5]. The network represented by this BSTN, namely using links 1, 2, 3, 4, and 5, satisfies the constraints, so it becomes the incumbent, with cost 5.

There is no point to adding additional links to this design, since it is feasible. Instead we consider deleting an link by creating the next BSTN [1 2 3 4 −5]. This notation means that links 1, 2, 3, and 4 are included, and link 5 cannot be included in the network design. This BSTN represents an infeasible network design since it fails the single link survivability constraint, and is thus "fathomed" by Test 7. The next BSTN is [1 2 3 −4]. This cannot be fathomed by any of the 6 tests, so we create [1 2 3 −4 5], which also fails the survivability test and hence is fathomed by Test 7.

Next we create [1 2 3 −4 −5], which cannot be fathomed, so we create [1 2 3 −4 −5 6], which is fathomed by Test 6. The next BSTN is [1 2 3 −4 −5 −6], which is fathomed by Test 1. Next is [1 2 −3], which cannot yet be fathomed, so we examine [1 2 −3 4], which also cannot be fathomed, so we examine [1 2 −3 4 5], which is fathomed by Test 7. The next BSTN is [1 2 −3 4 −5], which cannot be fathomed, so we examine [1 2 −3 4 −5 6], which is fathomed by Test 6. The next node, [1 2 −3 4 −5 −6] is fathomed by Test 1, so we examine [1 2 −3 −4A]. This cannot be fathomed, so we examine [1 2 −3 −4 5], which cannot be fathomed, and thus [1 2 −3 −4 5 6] which is found to be feasible, and hence fathomed by Test 8. Moreover, this design, with cost 4, is optimal, by Test 9.

The branch and bound produced an optimal design, and examined only 20 binary search tree nodes out of a possible 2^6=64 nodes. With n nodes, there are a total of 2^n possible BST nodes that can be generated by the branch and bound method. The fathoming tests are designed to drastically reduce this number. The branch and bound can be terminated before an optimal design is obtained, for example, by terminating the method after a user specified number of BST nodes have been examined with no new incumbent found. Early termination of the branch and bound method results in a near optimal network design, rather than a design that is provably optimal.

The Assembler

The job of the assembler, 12, is to combine the designs obtained by the seed generator to produce a network design for the problem $P(n, d, \Delta)$. As an example, for a network with 36 nodes, the assembler computes that there are several ways to connect 36 nodes:

(1) take 3 clusters of 12 nodes and interconnect the 3 clusters
(2) take 4 clusters of 9 nodes and interconnect the 4 clusters
(3) take 6 clusters of 6 nodes and interconnect the 6 clusters
(4) take 9 clusters of 4 nodes and interconnect the 9 clusters
(5) take 12 clusters of 3 nodes and interconnect the 12 clusters There are other possibilities, with unequal numbers of nodes per group, but they are not considered. Suppose that the network diameter cannot exceed 8, so that d=8. (For simplicity, we ignore in this illustrative example the maximum node degree constraint.) The assembler also computes that there are various ways of meeting the requirement that the network has diameter 8. The choices are the following:

(a) use clusters of diameter 1 and interconnect them with an inter-cluster network of diameter 3
(b) use clusters of diameter 2 and interconnect them with an inter-cluster network of diameter 2
(c) use clusters of diameter 3 and interconnect them with an inter-cluster network of diameter 1

For example, with choice (b) above, suppose we want to determine the shortest path between any two nodes A and B in the network. If A and B are in the same cluster, then they can be connected by a path of not more than 2 links, since the diameter of each cluster is 2. If A and B are not in the same cluster, they can be connected by a path that traverses at most 3 clusters of diameter 2 and two inter-cluster links; thus the total number of links does not exceed 8, as required.

Suppose that for the 5 different cluster sizes of 3, 4, 6, 9, and 12 nodes, and for the 3 different diameters of 1, 2, and 3, the seed generator 10 has already determined an optimal (or near-optimal) network design for the cluster. With 5 choices of cluster size and 3 choices of cluster diameter, there are 5*3=15 possible network designs that could be generated for a network of 36 nodes and diameter bound 8. The assembler 12 compares the costs of these 15 designs and picks the design with the smallest number of links. For example, consider the choice of 4 clusters, where each cluster has 9 nodes and a diameter of 3, and any two clusters are interconnected by a single link. The seed generator 10 has already computed that it requires 11 links for the optimal network design for each cluster, so 44 links are required for the four clusters. In addition, we require 6 links to interconnect any two clusters by a single link. Thus the total number of links required is 44+6=50 for this particular example.

Discussed herewith are the details of how the assembler 12 solves the network design problem $P(n, d, \Delta)$, where n is the number of nodes, d is the network diameter bound, and $\Delta$ is the maximum node degree bound. Since problems with a small number of nodes are solvable directly using the seed generator 10, we assume n>=6. For convenience, the following table 1 below summarizes the variables used in the discussion:

TABLE 1

| VARIABLE | DEFINITION |
| --- | --- |
| k | the number of clusters |
| p | the maximum diameter of any cluster |
| h | the maximum number of inter-cluster links required in a path between any two clusters |
| θ | the number of spare ports in any cluster |
| S (n, d, Δ) | the number of spare ports in the network design for P (n, d, Δ) |
| degB (i) | the number of inter-cluster links terminating on any node in cluster i |
| degB | degB = maximum value of degB (i), where i ranges over all clusters |
| θ | minimum number of spare ports, where the minimum is over all clusters |
| F (n, d, Δ) | the minimum cost netwrok design with n nodes, diameter bound d, and maximum node degree bound Δ |
| M (n, d, Δ) | the maximum node degree for the network design |

Cluster Sizes

The specified set of n nodes is divided into k clusters. We want the clusters to be the same size, or almost so, so we have n−k[n/k] clusters of size [n/k]+1 and k−(n−k[n/k]) clusters of size [x], where [x] denotes the smallest integer not exceeding x. For example, with n=18 and k=5, we have 3 clusters of size 4 and 2 cluster of size 3. We want each cluster to have at least 3 nodes, so we require [n/k]>=3, or k<=[n/3].

Cluster Diameter

Suppose any two clusters are connected by a path of not more than h inter-cluster links, where by an "inter-cluster link" is meant a link that connects two clusters. If the maximum diameter of any of the k clusters is p, then we can have at most h+(h+1)p links between any two nodes (since at worst we traverse h links between clusters, and p links inside each of h+1 clusters). Since we must have h>=1 and p>=1, then h+(h+1)p>=3, so the cluster method is only applicable if the network diameter bound d is at least 3.

From h+(h+1)p<=d we obtain h<=[(d−p)/(p+1)]<=[(d−1)/(p+1)]. Thus we never need to consider using more than [(d−1)/(p+1)] inter-cluster links to interconnect the k clusters. Also from the inequality h+(h+1)p<=d we obtain p<=[(d−h)/(h+1)]. Given a particular value for h, we want p as large as possible, since this will minimize the cost of each cluster. So we set p=[(d−h)/(h+1)].

Spare Ports

Recall that $\Delta$ is the maximum node degree bound, which means that no more than $\Delta$ links can connect to any node. If there are q links connecting to some node, where q<=$\Delta$, then there are $\Delta$−q spare ports on the node. The total number of spare ports in any subset of the nodes is the sum of the spare ports, where the sum is taken over all nodes in the subset.

Let $S(n, d, \Delta)$ be the number of spare ports in the network design generated by the cluster method for n nodes when the diameter bound is d and the maximum node degree bound is $\Delta$. The number of spare ports in a cluster with [n/k] nodes, diameter bound p, and node degree bound $\Delta$ is $S([n/k], p, \Delta)$. If $n-k[n/k]>0$, then there are clusters with [n/k]+1 nodes, and the number of spare ports in such a cluster is $S([n/k]+1, p, \Delta)$.

Let $\theta$ be the number of spare ports in any cluster. From the above comments, we have $$\theta = \begin{cases} S([n/k], p, \Delta) & \text{if } n - k[n/k] = 0 \\ \min\{S([n/k], p, \Delta), S([n/k]+1, p, \Delta)\} & \text{if } n - k[n/k] > 0 \end{cases} \quad \text{equation (1)}$$

For example, consider problem P(13,3,4). Choosing k=3, we have two clusters of size 4 and one cluster of size 5. Each cluster must have diameter 1. For the clusters of size 4, we require six links, and there are (4)(4)−(6)(2)=4 spare ports, since each link uses two ports (one at each endpoint). For the cluster of size 5, we require 10 links, and there are no spare ports, since (5)(4)−(10)(2)=0. Hence $\theta=0$.

Inter-Cluster Node Degree

We define degB(i) to be the number of inter-cluster links terminating on cluster i. For example, if the only links out of cluster 3 are a link joining cluster 3 to cluster 2, and a link joining cluster 3 to cluster 7, then degB(3)=2. We define degB to be the maximum value of degB(i), where the maximum is taken over all clusters i, where 1<=i<=k. Since the number of inter-cluster links connected to a given cluster cannot exceed the number of spare ports in that cluster, we have $$\deg B <= \theta,$$

where $\theta$ is defined by equation (1) above.

The Dynamic Programming Cost Recursion

The assembler 12 employs the optimization algorithm 14 known as dynamic programming. The dynamic program has a 2-dimensional state space (n,d), where n is the number of nodes and d is the diameter. For each fixed value of (n, d) we optimize over k, the number of clusters, and h, the maximum number of inter-cluster links required in a path between any two clusters. Let $$K(n) = \{k | 2 <= k <= [n/3], k \text{ integer}\},$$

$$H(d) = \{h | 1 <= h <= [(d-1)/2], h \text{ integer}\}.$$

Let $F(n, d, \Delta)$ be the optimal cost of the network constructed by the cluster approach. We have $$F(n, d, \Delta) = \min_{k \in K(n), h \in H(d)} \{F(k, h, \theta) + (k-n+k[n/k]) F([n/k], p, \Delta) + (n-k[n/k])F([n/k]+1, p, \Delta)\}, \quad \text{equation (2)}$$

where p is defined by $p=[(d-h)/(h+1)]$ and $\theta$ is defined by equation (1) above. This is the fundamental dynamic programming recursion that is the basis of the assembler 12.

The first term in the brackets $F(k, h, \theta)$ is the optimal cost of the inter-cluster links required to interconnect the k clusters such that the number of inter-cluster links between any two clusters does not exceed h and the number of inter-cluster links terminating at any cluster does not exceed $\theta$. The term $(k-n+k[n/k]) F([n/k], p, \Delta)$ is the cost of the $k-(n-k[n/k])$ clusters of size [n/k]. The third term $(n-k[n/k]) F([n/k]+1, p, \Delta)$ is the cost of the $n-k[n/k]$ clusters of size [n/k]+1. Thus we have expressed the cost of the design for a problem with n nodes and diameter bound d in terms of problems with fewer nodes and a smaller diameter bound. In order to solve the dynamic program, we must first calculate $F(n, d, \Delta)$ for small values of n, d, and $\Delta$. The solutions to these small problems are obtained from component 10, the seed generator.

A Recursion for Computing Spare Ports

The calculation of $\theta$, which is required in the dynamic programming recursion of equation (2) above, requires the spare port quantities $S([n/k], p, \Delta)$ and $S([n/k]+1, p, \Delta)$. This section shows how to calculate these quantities. Consider $P(n, d, \Delta)$. Pick $k \in K(n)$ and $h \in H(d)$, and consider the network generated by the cluster method for this k and h. The number of spare ports in the network satisfies the recursion $$S(n, d, \Delta) = (k-n+k[n/k])S([n/k], p, \Delta) + (n-k[n/k]) S([n/k]+1, p, \Delta) - 2F(k, h, \theta).$$

To see this, we observe that the first term $(k-n+k[n/k]) S([n/k], p, \Delta)$ is the total spare in the $(k-n+k[n/k])$ clusters of size [n/k]. The second term is the total spare in the $n-k[n/k]$ clusters of size [n/k]+1. As for the third term, $F(k, h, \theta)$ is the optimal number of inter-cluster links. Each inter-cluster link uses two ports, one at each end. Hence the inter-cluster links consume $2F(k, h, \theta)$ ports, which must be subtracted from the spare. This is a recursion, since the number of spare ports for a network with n nodes is computed using the number of spare ports in clusters of [n/k] or [n/k]+1 nodes.

Let $\bar{F}(n, d, \Delta)$ be the cost of a feasible network design for $P(n, d, \Delta)$ generated by some particular algorithm (whether by this cluster method or anything else). Then the number $S(n, d, \Delta)$ of spare ports is given by $S(n, d, \Delta) = n\Delta - 2\bar{F}(n, d, \Delta)$, since each node has $\Delta$ ports and the $\bar{F}(n, d, \Delta)$ links consume $2\bar{F}(n, d, \Delta)$ ports. In particular, if we use an exact method such as branch and bound to solve small instances of $P(n, d, \Delta)$, as in the seed generator 10, then the number of spare ports is maximized, which is beneficial for solving larger instances of problem $P(n, d, \Delta)$ using the cluster method.

A Recursion for Computing the Maximum Node Degree

Consider the network design generated by the cluster method as applied to $P(n, d, \Delta)$. For node v, let $M_v(n, d, \Delta)$ be the number of links (intra-cluster or inter-cluster) in the network design connected to node v, and let $M(n, d, \Delta) = \max\{M_v(n, d, \Delta) | 1 <= v <= n\}$. Then $M(n, d, \Delta)$ is the maximum number of links connected to any node, i.e., it is the maximum node degree. We now show that $M(n, d, \Delta)$ can be computed via a recursion.

Let k* and h* be the optimal values of k and h in the fundamental recursion equation (2) above, and let $p^* = [(d-h^*)/(h^*+1)]$. Consider first any cluster with [n/k*] nodes. Then $M([n/k^*], p^*, \Delta)$ is the maximum node degree of any node in the cluster. Define $$e_1 = S([n/k], p^*, \Delta) - [n/k^*](\Delta - M([n/k^*], p^*, \Delta)).$$

Then $e_1$ is the number of spare ports that can be used in a cluster of size [n/k*] without increasing the maximum node degree of the cluster. If $\deg B <= e_1$ then there are sufficiently many spare ports in the cluster to accommodate all the inter-cluster connections without increasing the maximum node degree of any node in the cluster. Otherwise, the maximum node degree must increase by ceiling$((degB-e_1)/[n/k])$, where ceiling(x) is the smallest integer not less than x. So we define $$g_1 = M([n/k^*], p^*, \Delta) \text{ if } degB <= e_1$$

and $$g_1 = M([n/k^*], p^*, \Delta) + \text{ceiling }((degB-e_1)/[n/k^*])$$
otherwise.

Next, consider any cluster with $[n/k^*]+1$ nodes. If $n-k^*[n/k^*]=0$ there are no such clusters, and we define $g_2=0$. If $n-k^* [n/k^*]>0$, let $$e_2 = S([n/k^*]+1, p^*, \Delta) - ([n/k^*]+1)(\Delta - M([n/k^*]+1, p^*, \Delta)).$$

Since $M([n/k^*]+1, p^*, \Delta)$ is the maximum node degree of any node in the cluster, then $e_2$ is the number of spare ports that can be used in the cluster without increasing the maximum node degree of the cluster. If $degB<=e_2$, then there are sufficiently many spare ports in the cluster to accommodate all the inter-cluster connections without increasing the maximum node degree of any node in the cluster. Otherwise, the maximum node degree must increase by ceiling$((degB-e_2)/([n/k^*]+1))$. Thus if $n-k^*[n/k^*]>0$ we have $$g_2 = M([n/k^*]+1, p^*, \Delta) \text{ if } degB <= e_2$$

and $$g_2 M([n/k^*]+1, p^*, \Delta) + \text{ceiling}((degB-e_2)/([n/k^*]+1))$$
otherwise.

Finally, we have the result $$M(n, d, \Delta) = \max\{g_1, g_2\},$$

which expresses the maximum node degree for $P(n, d, \Delta)$ in terms of the maximum node degree for smaller size problems.

To illustrate this, consider $P(19, 5, 3)$. Running the dynamic program, we have $k^*=4$, $h^*=1$, and $p^*=2$. There is one cluster with 4 nodes and 3 clusters with 5 nodes. The optimal network design for each cluster is a ring. For the one cluster with 4 nodes we have $M([n/k^*], p^*, \Delta)=2$ and $S(4, 2, 3)=4(\Delta-2)=4$. For each of the three clusters with 5 nodes we have $M([n/k^*]+1, p^*, \Delta)=2$ and $S(5, 2, 3)=5(\Delta-2)=5$. We have $e_1=e_2=0$, since the design for each cluster has exactly two links connecting to each node. Three inter-cluster links connect to each cluster. For the 4 node cluster we have $[3/4]=1$, so $g_1=3$. For each 5 node cluster we have $[3/5]=1$, so $g_2=3$. Hence $M(19, 5, 3)=3$.

As a second example, consider $P(24, 5, 4)$. We have $k^*=4$, $h^*=1$, $p^*=2$, $n/k^*=6$, and $F(6, 2,4)=7$. From the seed generator 10, the optimal network design for $P(6,2,4)$ uses 7 links and has $M(6,2,4)=3$. We have $S(6, 2, 4)=n\Delta-(7)(2)=10$, so $e_1=10-6(4-3)=4$. Since 3 inter-cluster links connect to each cluster, we have $degB=3<e_1$, and $g_1=M(6, 2, 4)$. Since $g_2=0$, then $M(24, 5, 4)=M(6, 2, 4)=3$.

Figure 5:
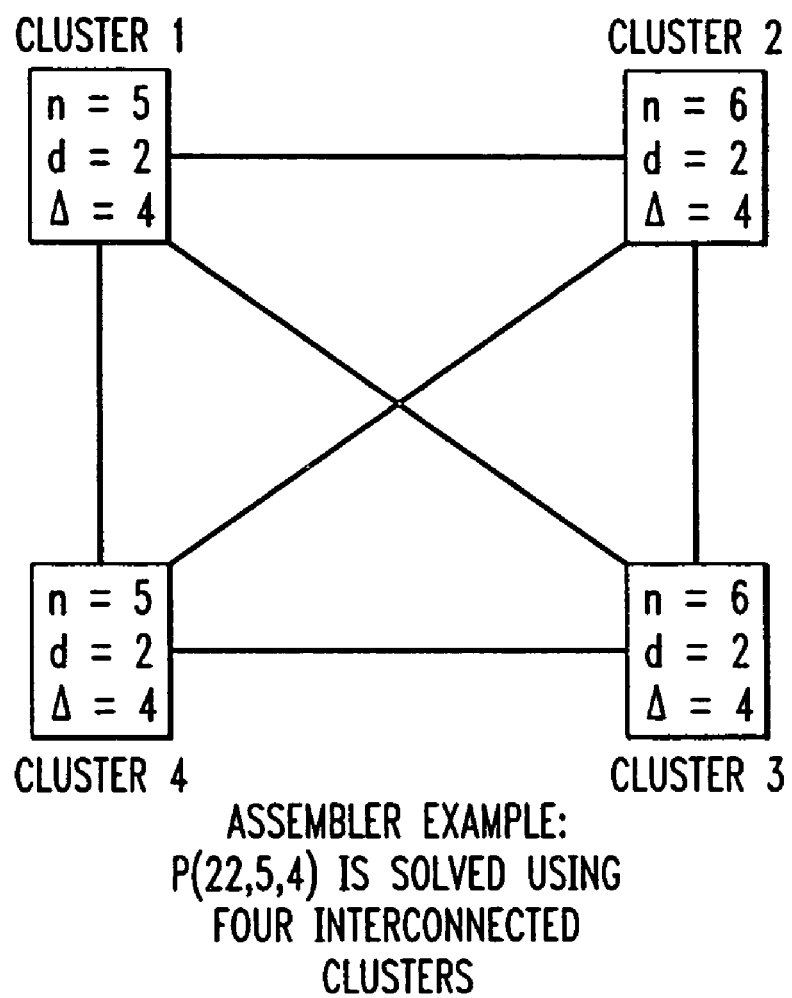
FIG. 5 is a block diagram illustrating the design for a large network constructed by the cluster method using the assembler.

As a third example illustrating the design for a large network constructed by the cluster method, FIG. 5 illustrates the solution generated by the assembler 12 to the network design problem $P(22,5,4)$. The design is obtained by interconnecting the network designs for four small problems. The assembler determines that $k^*=4$, $h^*=1$, and $p^*=2$. There are two instances of cluster $P(5,2,4)$ and two instances of cluster $P(6,2,4)$ that are interconnected. The optimal network design for $P(5,2,4)$ uses 5 links and the optimal design for $P(6,2,4)$ uses 7 links. In addition, there are 6 inter-cluster links, for a total of 30 links in the network design for $P(22,5,4)$. We have $S(5,2,4)=10$, $S(6,2,4)=10$, and so $S(22,5,4)=(2)(10)+(2)(10)-(2)(6)=28$. Also, $M(5,2,4)=2$, $M(6,2,4)=3$, and $M(22,5,4)=3$.

Performance of the Cluster Method

Figure 6:
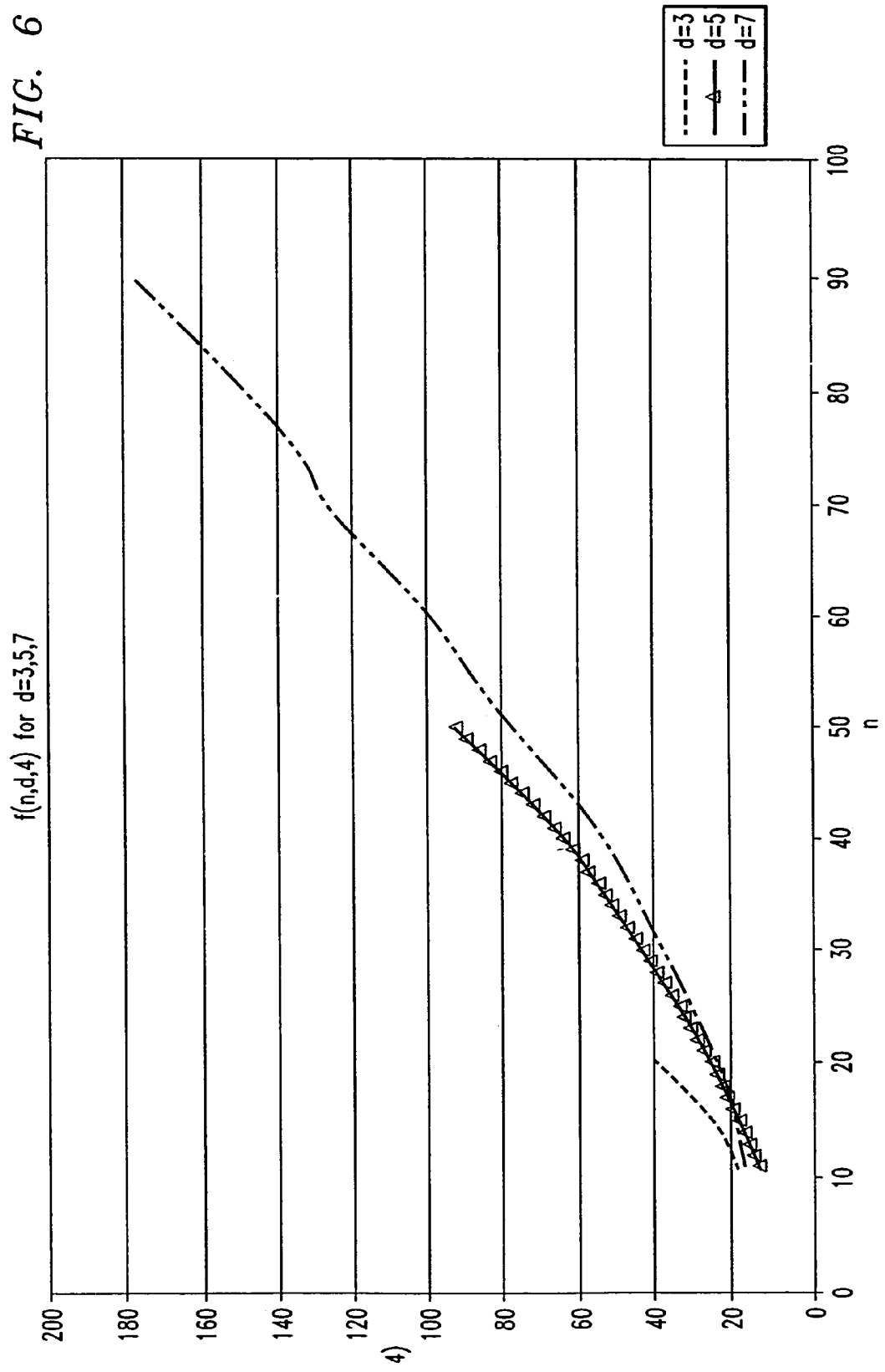
FIG. 6 is a graphical representation of the total number of links in the network design versus the number of nodes for three different network diameter bounds.

Referring to FIG. 6, there is shown a graph representing $F(n, d, 4)$, where $F(n, d, 4)$ is the total number of links used in the network design for $P(n, d, 4)$, where n ranges from 11 to 90, for diameters bounds d=3, 5, and 7 and for the maximum node degree bound $\Delta=4$. Each network design is generated by the cluster method. The same maximum node degree bound was used in all network designs, and all network designs satisfy the survivability constraints. To generate all these network designs, we need only apply the cluster method once, to $P(100, 7, 4)$, since the cluster method will solve $P(n, d, 4)$ for n<100 and d=3, 5, and 7 as intermediate steps in the solution of $P(100, 7, 4)$. The assembler 12 took 0.71 seconds to run on a 120 MHz laptop PC. The results are displayed in FIG. 6. The algorithm stops at n=20 when d=3, since the assembler deems $P(n, 3, 4)$ infeasible for n>20. The design for $P(20, 3, 4)$ calls for 5 clusters and uses 40 links. Similarly, the algorithm deems $P(n, 5, 4)$ infeasible for n>50; the design for $P(50, 5, 4)$ calls for 10 clusters with diameter 2, and uses 95 links. Lastly, the algorithm deems $P(n, 7, 4)$ infeasible for n>90. The design for $P(90, 7, 4)$ calls for 5 clusters of diameter 3, and uses 180 links; each of the 5 clusters of size 18 in turn is composed of 5 clusters: three clusters of size 4 and two clusters of size 3. Thus the cluster method is truly hierarchical, since the design for the 90 node network interconnects clusters of 18 nodes, and the design for the 18 node network interconnects clusters of 3 nodes and 4 nodes.

The results also allow determining the maximum n for which $F(n, d, \Delta)<=c$ for a given d, $\Delta$ and c. For example, referring to FIG. 6, the largest n for which $F(n, 3, 4)<=40$ is n=20; the largest n for which $F(n, 5, 4)<=40$ is n=27; and the largest n for which $F(n, 7, 4)<=40$ is n=31. Moreover, by specifying n, $\Delta$, and c, the cluster method can determine the smallest d such that there is a feasible network design for which $F(n, d, \Delta)<=c$. Finally, by specifying n, d, and c, the cluster method can determine the smallest $\Delta$ such that there is a feasible network design for which $F(n, d, \Delta)<=c$. Each of these questions often arises in the design of telecommunications networks.

It will be apparent that the present invention has been described herein with reference to certain preferred or exemplary embodiments. The preferred or exemplary embodiments described herein may be modified, changed, added to, or deviated from without departing from the intent, spirit and scope of the present invention, and it is intended that all such additions, modifications, amendments and/or deviations be included within the scope of the following claims.

The invention claimed is:

1. A method for optimally connecting a large telecommunications network having a plurality of n nodes interconnected by a plurality of links so as to minimize network cost and satisfy connectivity constraints, the method comprising the steps of:
   separating the n nodes into k clusters, for a range of values of k wherein the connectivity constraints comprise survivability constraint, diameter constraint, and node degree constraint;
   generating a near-optimal design for each of the k clusters to select the links interconnecting the nodes in each cluster subject to said connectivity constraints; and determining a near-optimal set of links for full set of the n nodes by combining the designs for each of the k clusters subject to said connectivity constraints, wherein said determining step is performed by dynamic programming technique, and said near-optimal set of links being nearly smallest possible number of said links.

2. The method of claim 1 wherein the generating step is performed by branch-and-bound technique.

3. The method of claim 2 wherein said survivability constraints comprise immunity to failure of a single link.

4. The method of claim 1 wherein the near-optimal network design for said n nodes satisfies the diameter constraint.

5. The method of claim 1 wherein the diameter constraint specifies that the distance between any two of the n nodes in the network cannot exceed a specified value, wherein said specified value is a diameter bound for the network.

6. The method of claim 1 wherein the near-optimal network design for said n nodes satisfies the maximum node degree constraint.

7. The method of claim 1 wherein the maximum node degree constraint specifies that the maximum number of links connected to any of the n nodes cannot exceed a specified value, wherein said specified value is maximum node degree bound.

8. The method of claim 1 further comprising: determining a network with near maximal number of nodes that can be interconnected by a specified plurality of c links subject to the connectivity constraints.

9. The method of claim 1 further comprising: determining a network with near minimal diameter for interconnecting a specified plurality of n nodes and c links to satisfy the node degree and the survivability constraints.

10. The method of claim 1 further comprising: determining a network with maximum node degree to be near-minimal, for interconnecting a specified plurality of n nodes and c links to satisfy the diameter and survivability constraints.

11. A network design apparatus that interconnects a plurality of n nodes by a plurality of links subject to connectivity constraints, the apparatus comprising:

a seed generator for computing a near-optimal design for a set of clusters, wherein said computing step is performed by branch-and-bound optimization algorithm and a binary search tree; and an assembler for determining a near-optimal design for the n nodes, by combining the near-optimal designs for the clusters to minimize total number of the links; wherein said determining step is performed by dynamic programming optimization algorithm and said connectivity constraints comprise survivability constraint, diameter constraint and node degree constraint.

* * * * *